(12) United States Patent
Bernard et al.

(10) Patent No.: US 7,139,644 B2
(45) Date of Patent: Nov. 21, 2006

(54) PROCESS AND SYSTEM FOR TRANSMITTING INFORMATION ON AN AIRCRAFT

(75) Inventors: Denys Bernard, Pelleport (FR); Yvan Fernandez-Ramos, Toulouse (FR)

(73) Assignee: Airbus France, Toulouse (FR)

( * ) Notice: Subject to any disclaimer, the term of this patent is extended or adjusted under 35 U.S.C. 154(b) by 346 days.

(21) Appl. No.: 10/851,323

(22) Filed: May 24, 2004

(65) Prior Publication Data
US 2004/0249522 A1    Dec. 9, 2004

(30) Foreign Application Priority Data
Jun. 4, 2003   (FR) .................................. 03 06733

(51) Int. Cl.
*H04L 12/22*   (2006.01)
*G06F 7/00*    (2006.01)
(52) U.S. Cl. .............................. 701/3; 701/29; 701/33; 710/104
(58) Field of Classification Search ............. 701/3, 701/29, 36, 24, 2, 33; 244/1 R; 714/763, 714/752; 710/100, 104
See application file for complete search history.

(56) References Cited

U.S. PATENT DOCUMENTS

| | | | |
|---|---|---|---|
| 5,768,528 A | | 6/1998 | Stumm |
| 5,805,799 A | * | 9/1998 | Fredrickson et al. .......... 714/52 |
| 6,401,013 B1 | * | 6/2002 | McElreath ...................... 701/3 |
| 6,442,571 B1 | | 8/2002 | Haff et al. |
| 6,668,215 B1 | * | 12/2003 | Lafon et al. .................... 701/3 |
| 6,839,055 B1 | * | 1/2005 | Nguyen ...................... 345/204 |
| 2004/0068350 A1 | * | 4/2004 | Tomson ........................ 701/1 |

OTHER PUBLICATIONS

R. McCartney, et al.; "An Arctic D-Size, Liquid Crystal Display For Aircraft Primary Flight Instruments," Digital Avionics Systems Conference, 1994, 13th DASC., AIAA/IEEE Phoenix, AZ USA Oct. 30-Nov. 3, 1994, New York NY, USA, IEEE, Oct. 30, 1994, pp. 620-625, XP010127068, ISBN: 0-7803-2425-0.

* cited by examiner

*Primary Examiner*—Tan Q. Nguyen
(74) *Attorney, Agent, or Firm*—Stevens, Davis, Miller & Mosher, LLP

(57) ABSTRACT

A process and system for transmitting information on an aircraft may employ an avionics-type device having a first determining section that determines a first check code representative of information that one wishes to display on a display screen of an interface device available to an operator. The interface device may include a second determining section that determines an image corresponding to the representation of the information and a third determining section that determines a second check code representative of the image. A comparator intercompares the first and second check codes and displays the image on the display screen only if the first and second check codes are identical.

6 Claims, 2 Drawing Sheets

PROCESS AND SYSTEM FOR TRANSMITTING INFORMATION ON AN AIRCRAFT

FIELD OF THE INVENTION

The present invention relates to a process and a system for transmitting information on an aircraft.

BACKGROUND OF THE RELATED ART

It is known that most aircraft currently in service, in particular civil transport planes, are equipped with onboard electronic devices, in particular computers of so-called "avionics type". These electronic devices are used, in particular, for the aircraft's strategic flight functions such as the flight controls. These devices have, consequently, to exhibit a very high level of reliability, able to guarantee a failure rate of the aircraft that is lower than that demanded by the certifying authorities. The communication networks and the links between such onboard devices (computers) of avionics type must meet the same reliability demands.

Certain modern transport planes, such as planes of the "Airbus A340-600" and "Airbus A318" type for example, also comprise so-called "open world" onboard equipment, which is not specific to aeronautical applications. This "open world" equipment is interface means (of "man-machine" type) available to an operator, in particular a pilot, of the airplane. By way of nonlimiting example, mention may be made of so-called industrial processors, portable computers, printers, etc. Such "open world" equipment exhibits a lower level of reliability than that of the aforementioned devices of avionics type. It nevertheless has the advantage of being much cheaper than them and its reliability level is sufficient for applications that are not directly related to maneuvers of the plane, such as for example the consulting of maintenance documentation or diagnostic aid with regard to maintenance. When an airplane comprises interface means of open world type, it is sometimes beneficial to be able to use one or more of these interface means, to allow an operator to exchange information with devices of avionics type. This may be useful in particular within the framework of maintenance operations on the airplane, for consulting values of parameters available in devices of avionics type or for testing certain components of the airplane (for example electrical circuits, control surfaces, etc). the maneuvering of which is controlled by such devices of avionics type.

However, even if these maintenance operations exhibit lesser criticalness than that of the flight phases of the airplane, the reliability level of said interface means of open world type may not be sufficient in certain cases. Thus, by way of example, when a maintenance operation involves the maneuvering of a control surface, it is imperative for the latter not to trigger inadvertently, since inadvertent triggering could be dangerous for personnel located in proximity to said control surface. Likewise, when a maintenance operation entails the handling of electrical equipment, the operator must ensure that this equipment is not live, erroneous information possibly having fatal consequences.

Consequently, it is generally strongly discouraged, in particular for reliability and hence safety reasons, to implement transmission of sensitive information on an aircraft between a device of avionics type, such as described above, and an interface means of aforesaid type.

SUMMARY OF THE INVENTION

An object of the present invention is to remedy these drawbacks. It relates to a particularly reliable process for transmitting information on an aircraft, from a device of avionics type to at least one interface means (of "open world" type) which is available to an operator of said aircraft, said transmitted information being intended to be displayed by said interface means on at least one display screen, and said device and said interface means being capable of being connected together by way of at least one information transmission link.

For this purpose, according to the invention, said process is noteworthy in that:

a) said device determines a first check code which is representative of the information that one wishes to display on said display screen of said interface means;

b) said information is transmitted from said device to said interface means, via said information transmission link;

c) said interface means determines an image corresponding to the representation of said information thus transmitted;

d) said interface means determines a second check code which is representative of said image;

e) said first and second check codes are compared; and f) only if said first and second check codes are identical, said interface means displays, on said display screen, said image corresponding to the representation of said information.

Thus, by virtue of the invention, an image is only displayed if identity is apparent between the two check codes, namely between said first check code which is determined before the construction of the image (on the basis of the information to be transmitted and to be displayed) and which thus constitutes a prediction of what the second check code ought to be, and said second check code which is representative of the image (corresponding to the information transmitted) after construction thereof. Of course, in the absence of any error during the transmission of the information, the two check codes are identical. By virtue of this check, particularly reliable information transmission is obtained. The risk to safety is therefore very small.

Moreover, the process in accordance with the invention makes it possible to display information reliably while transmitting only a restricted number of data from the device of avionics type to the interface means of "open world" type, used for displaying the information. Thus, the information can be transmitted in a form (textural, numerical, etc) requiring the transmission of only a small quantity of data, rather than in the form of an image to be displayed on this interface means of "open world" type, which would require a much larger number of data. Moreover, by virtue of the invention, it is not necessary to determine (or construct) the image with the aid of the device of avionics type, thereby making it possible to relieve said device of this task of image determination which generally requires a not inconsiderable computation time.

It will be noted that the image of an item of information or of a message is formed by concatenating the elementary images of the characters constituting said item of information or said message. For example, the image of "ABCD", is constructed by juxtaposing the elementary images of "A", "B", "C" and "D".

In a first embodiment, in step e), said interface means transmits said second check code to said device, which then compares said first and second check codes and transmits the result of this comparison to said interface means.

In a second embodiment, said device transmits said first check code to said interface means, which compares said first and second check codes in said step e).

The present invention also relates to an information transmission system carried on board an aircraft.

According to the invention, said system of the type comprising:

at least one device of avionics type;

at least one interface means available to an operator, and comprising at least one display screen; and at least one information transmission link capable of connecting together said device and said interface means, is noteworthy in that:

said device comprises a means for determining a first check code which is representative of information that one wishes to display on said display screen of said interface means;

said device is formed so as to transmit information to said interface means, via said information transmission link;

said interface means comprises a first means for determining an image corresponding to the representation of information transmitted, and a second means for determining a second check code which is representative of said image;

said system furthermore comprises a means of comparison for intercomparing first and second check codes; and said interface means is formed so as to display, on said display screen, an image corresponding to the representation of information transmitted, only if the corresponding first and second check codes are identical.

In a first embodiment, said means of comparison form part of said device, whereas, in a second embodiment, said means of comparison form part of said interface means.

BRIEF DESCRIPTION OF THE DRAWINGS

The figures of the appended drawing will elucidate the manner in which the invention may be embodied. In these figures, identical references designate similar elements.

DETAILED DESCRIPTION OF EMBODIMENTS

Figure 1:
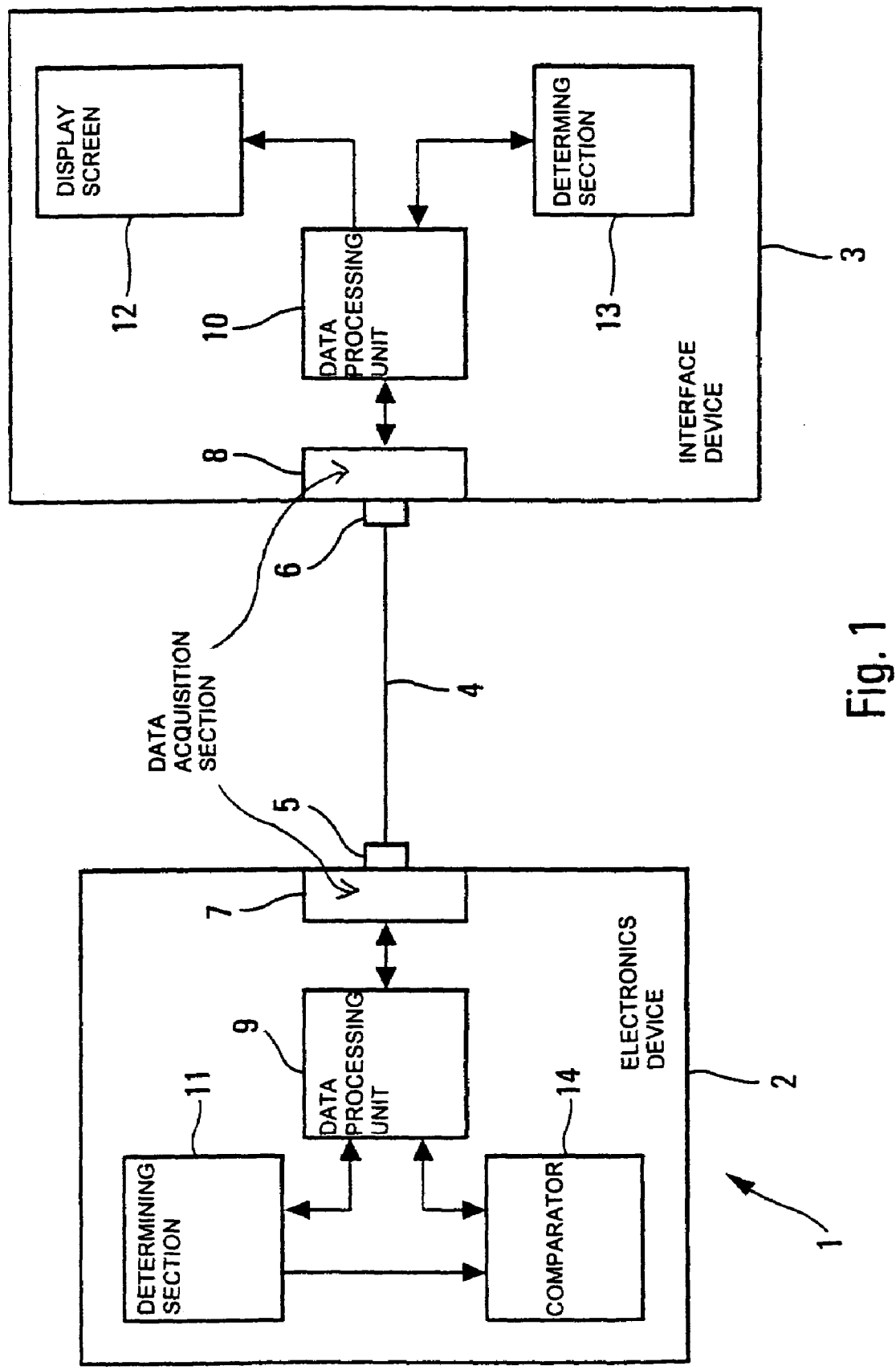
FIGS. 1 and 2 are the schematic diagrams of two different embodiments of an information transmission system in accordance with the invention.
Figure 2:
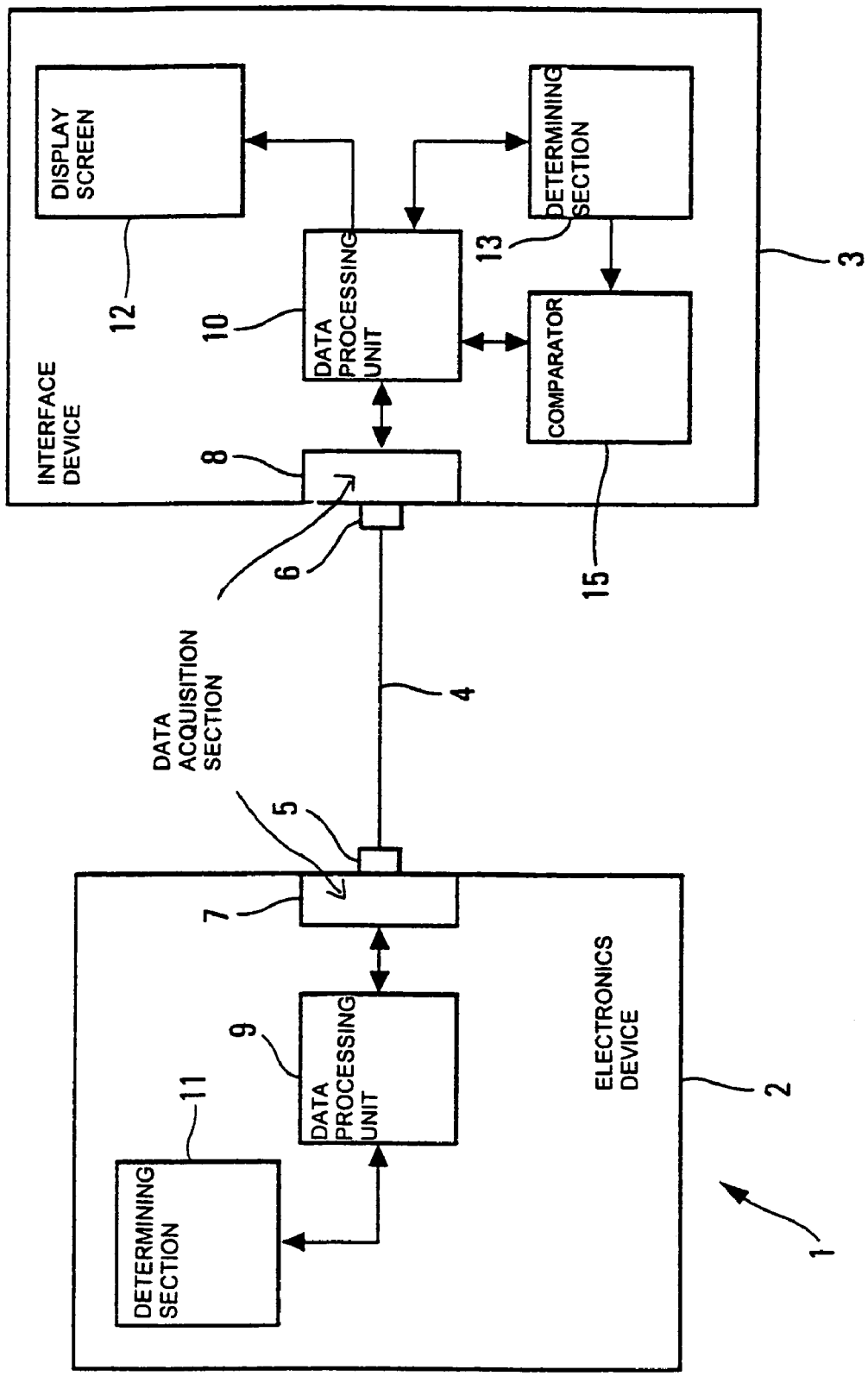

The system 1 in accordance with the invention and represented diagrammatically in FIGS. 1 and 2 is intended for the transmission of information on an aircraft (not represented), in particular a civil transport plane.

More precisely, said system 1 is of the type comprising at least:

an electronics device 2 of avionics type, in particular a computer, for example a flight control computer, which is mounted fixedly on the aircraft and which exhibits a very high reliability level, able to guarantee a failure rate of the aircraft that is lower than that demanded by the certifying authorities.

an interface means 3, for example a portable computer, which is available to an operator of the aircraft, which is of "open world" type, which is also carried on board the aircraft and which exhibits reduced reliability so as not to generally guarantee the failure rate demanded by the aircraft's certifying authorities;

an information transmission link 4, of standard type, capable of being connected by standard means of connection 5 and 6 provided at its ends, respectively, to the device 2 and to the interface means 3, so as to connect these latter together and to allow the implementation of information transmission between them.

Moreover, said device 2 and said interface means 3 also comprise, each:

a data acquisition means 7, 8; and a data processing unit 9, 10 which is connected to said data acquisition means 7, 8.

The object of the system 1 is, in particular to allow the transmission of the information from the device 2 to the interface means 3.

To do this, according to the invention:

said device 2 comprises a means 11 for determining a first check code C1 which is representative of information that one wishes to display on a standard display screen 12 of said interface means 3;

said device 2 is formed (unit 9) for transmitting information to said interface means 3, via said information transmission link 4;

said interface means 3 comprises a means (unit 10) for determining an image corresponding to the representation of information received, and a means 13 for determining a second check code 2 which is representative of said image;

said system 1 moreover comprises means of comparison 14, 15 for intercomparing first and second check codes C1 and C2; and said interface means 3 is formed so as to display, on said display screen 12, an image corresponding to the representation of an item of information, only if the corresponding first and second check codes C1 and C2 are identical.

Thus, by virtue of the invention, an image is only displayed if identity is apparent between the two check codes C1 and C2, namely between said first check code C1 which is determined by the means 11 of the device 2 before the construction of the image and which thus constitutes a prediction of what this second check code C2 ought to be, and said second check code C2 which is determined by the means 13 of the interface means 3 and which is representative of the image after construction thereof. By virtue of this check, particularly reliable information transmission is obtained from the device 2 of avionics type to the interface means 3 of "open world" type. The risk for the safety of the aircraft is therefore very low.

Said check code C1, C2 may represent in particular a standard checksum. It is known that such a checksum is a sum which is calculated not for its intrinsic value, but so as to verify the integrity of the check data which served to establish it. These check data are either digits, or other characters regarded as numbers in the course of the calculation of the checksum.

Moreover, the system 1 in accordance with the invention makes it possible to display, on the display screen 12 of the interface means 3, information in a reliable manner, while transmitting only a restricted number of data from the device 2 of avionics type to said interface means 3 of "open world" type, which is therefore used for displaying the information. Thus, the information can be transmitted in a form (textual, numerical, etc.) requiring the transmission of only a small quantity of data rather than in the form of an image, which would require a much larger number of data. Moreover, by virtue of the invention, it is not necessary to determine (or construct) the image with the aid of the device 2 of avionics type, thereby making it possible to relieve said device 2 of such a task which generally requires a not inconsiderable computation time.

More formally:

let m be the message (or item of information) to be displayed on the interface means 3. This information m is a string of alphanumeric characters. For example, the message (or information) "good morning" is the character string: {"b", "o", "n", "j", "o", "u", "r"]; and let i be the image which represents the information m (which is materialized by a computer file, that is to say a sequence of bits), it is assumed that there exists a computer function A (implemented by the unit 10) which makes it possible to generate the image i from the information m: $i=A(m)$.

It is assumed moreover that there exist two functions F and G implemented respectively by the means 13 and 11, which make it possible to calculate an integrity element (or check code) c for the image: $c=F(i)=G(m)$. The function F therefore calculates the integrity element (check code C2) on the basis of the image i, and the function G calculates it (check code C1) on the basis of the content of the message m (on the basis of "ASCII" codes for example). An example of such functions F and G will be specified later.

In a first preferred embodiment, represented in FIG. 1, said means of comparison 14 form part of said device 2. Thus, during a transmission of information, said interface means 3 transmits, via the link 4, said second check code C2 [or F(i)] determined by the means 13, to said device 2 which then compares, with the aid of said means of comparison 14, said first and second check codes C1 and C2 and transmits, via the link 4, the result of this comparison (permission to display or denial to display) to said interface means 3, which then displays or otherwise the corresponding image, on the display screen 12.

In a second embodiment represented in FIG. 2, said means of comparison 15 form part of said interface means 3. Thus, during a transmission of information, said device 2 transmits said first check code C1 [or G(m)] to said interface means 3 which then compares, with the aid of said means of comparison 15, said first and second check codes C1 and C2 and, as a function of this comparison, displays or otherwise the corresponding image on the display screen 12.

It will be noted that, in this second embodiment, the error detection rate is lower than in the (preferred) first embodiment described above, given that the comparison of the check codes C1 and C2 is carried out by the equipment (interface means 3) of "open world" type which exhibits lower reliability than the equipment (device 2) of avionics type.

Specified hereinbelow is an exemplary implementation of the invention. In this example, the image i is a computer file, composed of a header and of NxP bits, N being the number of bits used to describe a pixel, and P the number of pixels of the image. The header contains standard data which need not be detailed: dimensions of the image, number of bits per pixel, etc. Pixels are arranged line-wise (first the pixels of the first line, then the pixels of the second line, etc).

The aforesaid function A (calculation of the image) juxtaposes the images of the letters representing the message (or the information):

$$m = \{'b', 'o', 'n', 'j', 'o', 'u', 'r'\} \xrightarrow{A} i = \boxed{b|o|n|j|o|u|r}$$

The function F (implemented by the means 13 of the interface means 3) calculates a checksum of length L, on the useful part of the image file (hence excluding the header thereof). L is chosen among the divisors of N.

The function G (implemented by means 11 of the device 2) calculates the check code C1, by adding together the checksums of length L of each of the letters of the alphabet used for the message m. For example: $G(m)=G('b')+G('o')+G('n')+G('j')+G('o')+G('u')+G('r')$.

The values G(x) for every character x of the alphabet used to construct the messages are stored by said enhanced-reliability device 2.

The equality $F(i)=G(m)$ is guaranteed by the fact that L is a divisor of N (number of bits used to define a pixel), and the fact that the check code is calculated only on the useful part of the binary topogram. This example can be supplemented in such a way as to cover all or part of the header, if an error in the header may have an impact on the display: for example, it is possible to take account of the line length or the number of lines of the image in the calculation of the check code (since these numbers are also forecastable from the content of the message, by taking account of the height and the width of the elementary images).

The invention claimed is:

1. A process for transmitting information on an aircraft, from an avionics-type device to an interface device which is available to an operator of said aircraft, which information is intended to be displayed by said interface device on at least one display screen, said avionics-type device and said interface device being capable of being connected together by way of at least one information transmission link, wherein:
    a) said avionics-type device determines a first check code which is representative of the information that one wishes to display on said display screen of said interface device;
    b) said information is transmitted, from said avionics-type device to said interface device, via said information transmission link;
    c) said interface device determines an image corresponding to the representation of said information thus transmitted;
    d) said interface device determines a second check code which is representative of said image;
    e) said first and second check codes are compared; and
    f) only if said first and second check codes are identical, said interface device displays, on said display screen, said image corresponding to the representation of said information.

2. The process as claimed in claim 1, wherein in step e), said interface device transmits said second check code to said avionics-type device, which then compares said first and second check codes and transmits the result of this comparison to said interface device.

3. The process as claimed in claim 1, wherein said avionics-type device transmits said first check code to said interface device, which compares said first and second check codes in said step e).

4. An information transmission system carried on board an aircraft, said system comprising:
    at least one avionics-type device;
    at least one interface device available to an operator, and comprising at least one display screen; and
    at least one information transmission link capable of connecting together said avionics-types device and said interface device wherein:
    said avionics-type device comprises a first determining section that determines a first check code which is representative of information that one wishes to display on said display screen of said interface device;

said avionics-type device is formed so as to transmit information to said interface device, via said information transmission link;

said interface device comprises a second determining section that determines an image corresponding to the representation of information transmitted, and a third determining section that determines a second check code which is representative of said image;

said system furthermore comprises a comparator that intercompares first and second check codes; and said interface device is formed so as to display, on said display screen, an image corresponding to the representation of information transmitted, only if the corresponding first and second check codes are identical.

5. The system as claimed in claim 4, wherein said comparator forms part of said avionics-type device.

6. The system as claimed in claim 4, wherein said comparator forms part of said interface device.

* * * * *